July 3, 1923.
H. F. BIGGAM
TRAILER COUPLING
Original Filed Jan. 5, 1917
1,460,839
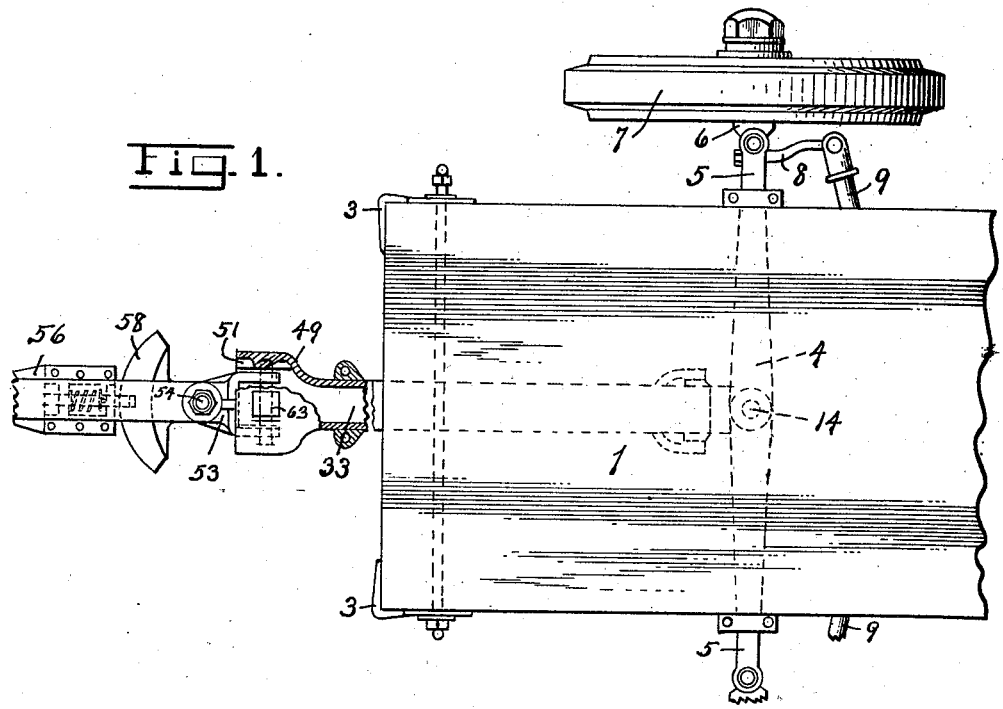
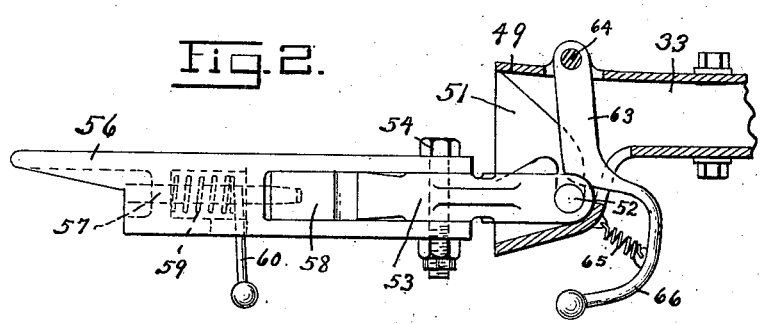
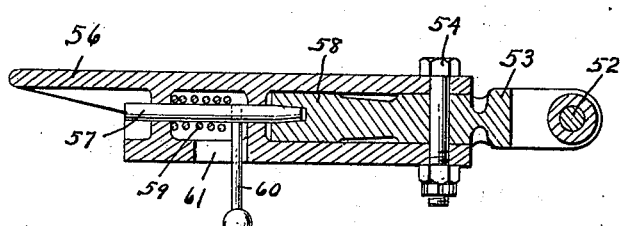
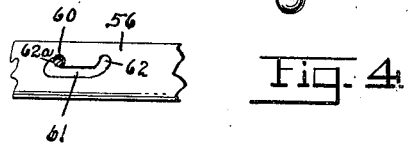
Inventor
Harry F. Biggam.
By Edward N. Pagelsen,
Attorney Patented July 3, 1923.

1,460,839

UNITED STATES PATENT OFFICE.

HARRY F. BIGGAM, OF MILWAUKEE, WISCONSIN, ASSIGNOR TO THE BIGGAM TRAILER CO., OF MILWAUKEE, WISCONSIN, A CORPORATION OF WISCONSIN.

TRAILER COUPLING.

Original application filed January 5, 1917, Serial No. 140,827. Divided and this application filed April 9, 1921. Serial No. 460,015.

*To all whom it may concern:*

Be it known that I, HARRY F. BIGGAM, a citizen of the United States, and residing at Milwaukee, in the county of Milwaukee and State of Wisconsin, have invented a new and Improved Trailer Coupling, of which the following is a specification.

This invention relates to means for connecting trailer vehicles to tractors, whether self propelled or themselves trailers, and its object is to provide a coupling which will permit free swinging movement between the draft mechanism and the draw bar of a trailer and which may be rendered substantially rigid while being used for traction purposes but which may be rendered flexible when the draw bar is held stationary and the trailer is pushed backward by the draft mechanism.

This application is a division of my copending application Serial Number 140,827, filed January 5, 1917, and the invention set forth consists principally in a coupling member having a horizontal pin by which it may be attached to the draw head of a trailer and the details of the draw head.

It further consists in a vertical pin by means of which the coupling member is connected to a draft link, means being provided for preventing lateral swinging movement between the draft link and the coupling member or permitting such movement at will.

It further consists of the details of construction illustrated in the accompanying drawing and particularly pointed out in the claims.

In the drawing, Fig. 1 is a plan of one end of a trailer and its draft mechanism, a part of the draw head being broken away. Fig. 2 is a side elevation of this draft mechanism. Fig. 3 is a central, vertical, longitudinal section thereof. Fig. 4 is a bottom plan of a part of the draft link.

Similar reference characters refer to like parts throughout the several views of the drawings of this and the patent application.

The structure shown in the drawing is one end 1 of a vehicle which may have both ends alike if desired. The frame may be of any desired construction, reinforced at the corners by the angle plates 3. An axle 4 has forks 5 at its ends to receive the steering knuckles 6 which carry the wheels 7 in the usual manner. Steering arms 8 connect to well known links 9. A king bolt 14 is indicated in dotted lines and on this the draw bar 33 is mounted to swing in a horizontal plane.

The outer end of this draw bar or the draw head 49 is hollow with substantially parallel sides or walls 50 formed with substantially spiral grooves 51 to receive the ends of the pin 52 carried by the rear forked end of the coupling member 53. This coupling member is mounted on a pin or bolt 54 carried by the link 56, which may be of any desired length, and this coupling member is normally locked from swinging relative to the link by means of a bolt 57 that engages in a proper notch in the circular front end 58 of the coupling member when this member is in alinement with the link 56.

Under certain conditions, as when the vehicle is being pushed backward by the link 56, when means not shown are employed to hold the draw bar central with the vehicle, this bolt 57 may be withdrawn against the tension of the spring 59 by means of a pin 60 attached to this bolt 57. This pin 60 is slidable in a slot 61 having notches 62 and 62$^a$, into one of which this pin 60 may be swung in order to hold the bolt 57 in either its outward or retracted positions.

In order to keep the pin 52 from jumping out of its seat in the bottom of the grooves 51, a latch 63 may be mounted on the pin 64 carried by the draw head. A spring 65 normally holds this latch over the pin 52, but the latch may be swung back to release the coupling member, a handle 66 being shown for this purpose. When this latch 63 is swung back to free the coupling member 53, this coupling member may be lifted out of engagement with the draw head while the link 56 and draw head are slowly separating.

The details and proportions of the several parts of this coupling may all be changed by those skilled in the art without departing from the spirit of my invention as set forth in the following claims.

I claim:—

1. In a vehicle, the combination of a draw bar mounted to swing in a horizontal plane and having an open end, a coupling member detachably connected to the front end of the draw bar embodying a body portion, a horizontal pin at one end of the body portion and adapted to enter the open end of the draw bar, a vertical pin mounted in said coupling member, and a link connected to the vertical pin.

2. In a vehicle, the combination of a draw bar mounted to swing in a horizontal plane and having a draw head at its outer end, said draw head being hollow with substantially parallel sides provided on their inner faces with grooves which are inclined upwardly from the outer end of the draw head and then turn downwardly, and a coupling adapted to enter the draw head and having a horizontal pin whose ends are adapted to enter the grooves in the sides of the draw head.

3. A draft mechanism embodying a hollow draw head, a draft link and a coupling member, said draw head having substantially spiral grooves in its sides, said coupling member having projections at one end whose ends are adapted to enter said grooves, also having its opposite end circular and notched, and also having a vertical pin at the center of curvature of the circular end, said draft link embodying an end adapted to connect to said vertical pin and also having a locking pin adapted to engage the notched circular end of the coupling member.

4. In a vehicle, the combination of a draw bar mounted to swing in a horizontal plane and having an open end, a coupling member detachably connected to the front end of the draw bar embodying a body portion, a horizontal pin at one end of the body portion and adapted to enter the open end of the draw bar, a vertical pin mounted in said coupling member, a link connected to the vertical pin, and means mounted on the draw head to hold the pin on the coupling member in position in the draw head.

5. A draft mechanism embodying a hollow draw head having an open end, a closed top and a closed bottom, and curved sided grooves in its opposed sides, a coupling member adapted to enter the open end of the draw head and having projections adapted to slide in said grooves, and a latch mounted in the draw head and adapted to hold said projections in said grooves.

6. A draft mechanism embodying a hollow draw head having an open end, a closed top and a closed bottom, and curved sided grooves in its opposed sides, a coupling member adapted to enter the open end of the draw head and having projections adapted to slide in said grooves, a latch mounted in the draw head and adapted to hold said projections in said grooves, and a spring to position the latch in operative position.

7. A draft mechanism embodying a draw head, a coupling member and a draft link, said coupling member having its rear end engaging the draw head and its front end circular, a pin mounted in the coupling member central with the circular front end, said draft link having a forked rear end provided with holes to receive the pin mounted in the coupling member, and a spring held bolt mounted in the draft link to lock the link and coupling member from swinging relative to each other.

8. A draft mechanism embodying a draw head, a coupling member and a draft link, said coupling member having its rear end engaging the draw head and its front end circular, a pin mounted in the coupling member central with the circular front end, said draft link having a forked rear end provided with holes to receive the pin mounted in the coupling member, a spring held bolt mounted in the draft link to lock the link and coupling member from swinging relative to each other, and a pin to move the bolt against the pressure of the spring, said link having a slot in which the pin is slidable, said slot having a lateral recess to receive the pin and prevent its movement.

HARRY F. BIGGAM.